May 26, 1931.　　　A. E. RIGGS　　　1,806,918

VALVE SEAT LAPPING MACHINE

Filed May 10, 1930

INVENTOR
Arthur E. Riggs.

BY Arthur C. Brown
ATTORNEY

Patented May 26, 1931

1,806,918

UNITED STATES PATENT OFFICE

ARTHUR E. RIGGS, OF SAPULPA, OKLAHOMA

VALVE SEAT LAPPING MACHINE

Application filed May 10, 1930. Serial No. 451,255.

My invention relates to valve seat lapping machines and more particularly to devices of this character for lapping ball valves and seats.

With apparatus heretofore provided for lapping ball valve seats, results have been unsatisfactory because of inefficient methods employed for rotating the valve in its seat.

It is the principal object of my invention to provide a machine embodying novel means for effecting positive and universal rotation of a ball within its seat to insure accuracy and speed in forming a fluid-tight seat for a ball valve.

A further object of this invention is to provide a device for simultaneously lapping a pair of seats with a single ball, thereby doubling the output of the machine.

In accomplishing these and other objects of my invention I have provided improved details of structure, the preferred form of which is illustrated in the accompanying drawings, wherein.

Figure 1:
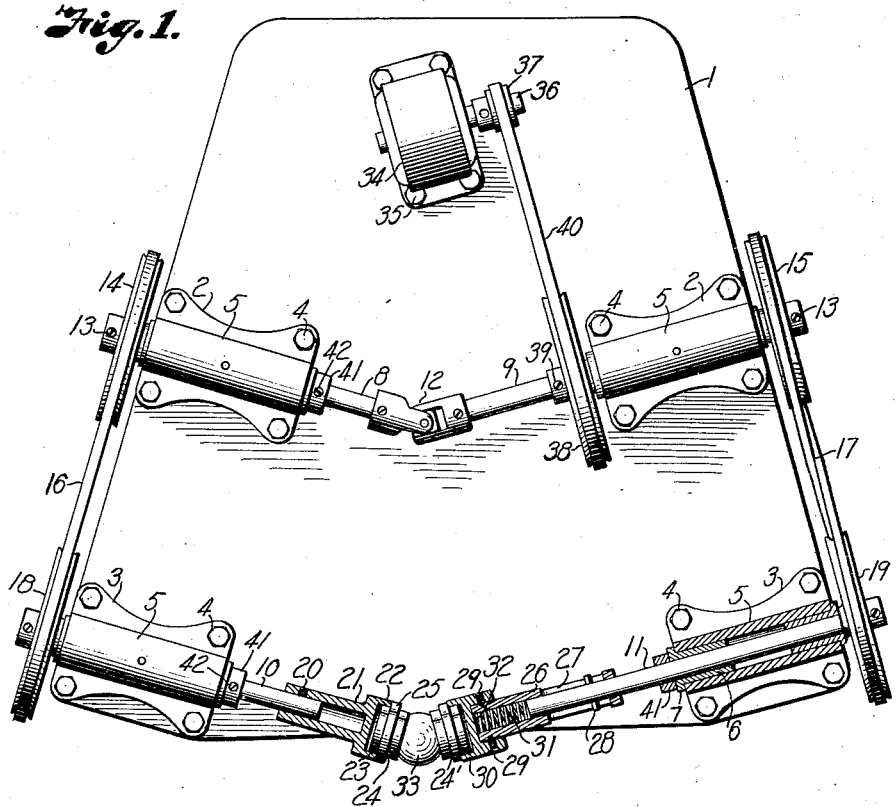
Fig. 1 is a plan view of a valve and seat lapping machine embodying my invention, portions thereof being illustrated in section to better disclose the operating mechanism.
Figure 2:
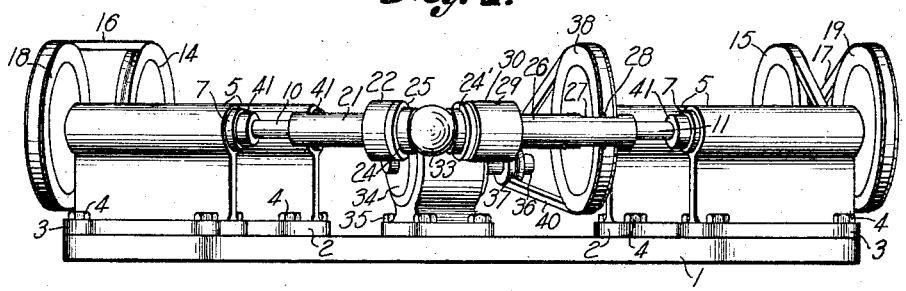
Fig. 2 is an elevational view of the front end of the device.

Referring more in detail to the drawings:

1 designates a base of substantially triangular shape whereon are mounted spaced pairs of brackets 2 and 3 each fixed to the base by bolts 4 and including a cylindrical bearing portion 5 for receiving a sleeve member 6, having an outer flange 7 engaging the end of the bearing to limit projection of the sleeve into the bearing.

Journaled in the bearings 2 and 3 are shaft sections 8—9 and 10—11 respectively, the sections 8—9 being joined at their inner ends by a universal coupling 12. Fixed on the outer ends of the sections 8 and 9 by screws 13, are grooved pulleys 14 and 15 respectively connected by belts 16 and 17 to pulleys 18 and 19, fixed on the outer ends of the shaft sections 10 and 11; the belt 17 being crossed to effect rotation of the shaft 11 reversely of shaft 10.

Secured on the inner end of the shaft section 10 by a set screw 20 is a sleeve 21 including a cup 22 for receiving the ring portion 23 of a valve seat collar 24 of the type commonly used in standing and traveling valves and having a peripheral flange 25 in abutment with the outer rim of the cup.

Figure 3:
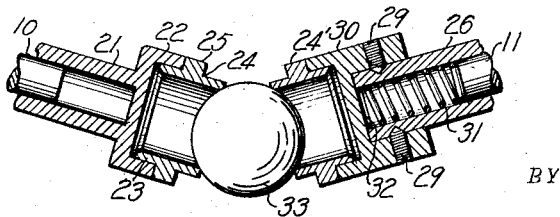
Fig. 3 is an enlarged central sectional view of opposite valve seats and cups illustrated in cooperative relation with a valve ball.

Slidably mounted on the inner end of the shaft section 11 is a sleeve 26 similar to sleeve 21 but having an elongated slot 27 into which a pin 28 on said shaft is extended to limited travel of the sleeve on the shaft for the purpose presently described. Removably fixed to the inner end of the sleeve 26 by screws 29 is a cup 30 carrying a valve seat 24'; the cup 30 being normally urged inwardly by an expansion spring 31 mounted in the sleeve 26 and engaging the inner end of the shaft 11 and the closed end wall 32 of the cup 30 to urge the valve seat against a valve ball 33, which may be inserted between the seats 24 and 24', thereby retaining the ball between the paired seats as particularly illustrated in Fig. 3.

Various means may be employed for rotating the shaft for the grinding and burnishing operations, but I have illustrated for this purpose a motor 34, mounted on the base by bolts 35 and having a shaft 36 provided with a drive pulley 37. A driven pulley 38 fixed on the shaft section 9 by a set screw 39 is operably connected with the drive pulley by a belt 40.

Thrust collars 41 adjacent the bearings 2 and 3 are fixed on the several shaft sections by set screws 42 to prevent longitudinal movement of said sections within the bearings.

The process of grinding and polishing a valve ball and seat, with an apparatus constructed and assembled as described, would be as follows:

A valve seat collar is mounted in each of the cups, and the sliding sleeve carrying one of the cups is retracted sufficiently against the tension of the enclosed spring to permit insertion of a ball valve between the valve seats. As the shafts carrying the cups are rotated in opposite directions by the motor, grinding compound is applied to the ball and due to the angular relation of the valve seats to the valve, a universal rotary motion of the ball is obtained and a uniform and accurate seat is rapidly ground into the valve seat collars. Polishing of the seats is then effected with a finer grade of compound, whereupon the valve seat collars are reversed in the cups, and seats are ground in like manner into the opposite ends thereof.

What I claim and desire to secure by Letters Patent is:

1. In a device of the character described, angularly disposed shafts, means on each shaft for receiving a valve seat collar, means for yieldingly retaining a ball valve between said collars, and means for rotating the shafts.

2. In a device of the character described, angularly disposed shafts, means on each shaft for receiving a valve seat collar, means for yieldingly retaining a ball valve between said collars, and means for rotating the shafts in opposite directions.

3. In a device of the character, described, a base, bearings mounted on the base in angular relation to each other, cooperating shaft sections in said bearings, means fixed on one shaft section for receiving a valve seat collar, means slidable on the other shaft section for receiving a duplicate collar, means for yieldingly urging the collars into supporting relation with a valve ball, and means for rotating the shafts.

4. In a device of the character described, a base, bearings mounted on the base in angular relation to each other, cooperating shaft sections in said bearings, means fixed on one shaft section for receiving a valve seat collar, means slidable on the other shaft section for receiving a duplicate collar, means for yieldingly urging the collars into supporting relation with a valve ball, and means for rotating the shafts in opposite direction.

5. In a device of the character described, a base, bearings mounted on the base in angular relation to each other, cooperating shaft sections in said bearings, means for operably connecting said shaft sections, a second set of bearings mounted on the base in angular relation to each other and in parallelism with said first-named bearings, means fixed on one shaft section for receiving a valve seat collar, means slidable on the other shaft section for receiving a duplicate collar, means for yieldingly urging said duplicate collar toward the other collar, and means for rotating the shafts.

6. In a device of the character described, a base, bearings mounted on the base in angular relation to each other, cooperating shaft sections in said bearings, means for operably connecting said shaft sections, a second set of bearings mounted on the base in angular relation to each other and in parallelism with said first-named bearings, means fixed on one shaft section for receiving a valve seat collar, means slidable on the other shaft section for receiving a duplicate collar, means for yieldingly urging said duplicate collar toward the other collar, and means for rotating the driven shaft sections in opposite directions.

In testimony whereof I affix my signature.

ARTHUR E. RIGGS.